United States Patent [19]

del ser Gonzalez

[11] Patent Number: 4,727,802
[45] Date of Patent: Mar. 1, 1988

[54] FRUIT PITTING MACHINE

[76] Inventor: Clemente del ser Gonzalez, Paseo de Talleres, 36, Madrid, Spain

[21] Appl. No.: 1,967

[22] Filed: Jan. 8, 1987

[51] Int. Cl.[4] .............................................. A23N 4/08
[52] U.S. Cl. ....................................... 99/494; 99/548; 99/561
[58] Field of Search ................. 99/494, 542, 546, 548, 99/544, 549, 552, 555, 565, 559–561; 426/485, 484, 282

[56] References Cited

U.S. PATENT DOCUMENTS

| | | | |
|---|---|---|---|
| 4,265,169 | 5/1981 | Silvestrini | 99/494 |
| 4,290,350 | 9/1981 | del ser Gonzalez | 99/494 |
| 4,596,182 | 6/1986 | del ser Gonzalez | 99/491 |
| 4,644,859 | 2/1987 | Rubio et al. | 99/494 |

*Primary Examiner*—Timothy F. Simone
*Attorney, Agent, or Firm*—Wenderoth, Lind & Ponack

[57] ABSTRACT

A fruit pitting machine includes a feeder tray for feeding fruit singly to a fruit conveyor chain which travels around a rotatable support to convey the fruit along a feed path. The rotatable support carries a plurality of pitting plungers and coring knives which are axially aligned and movable by cams toward each other such that a plunger pierces one end of the fruit and a coring knife cuts out a core cap at the other end of the fruit. Thereafter, the pitting plunger pushes the core cap and pit into the coring knife and the pitting plunger and coring knife are retracted away from the feed path. The plunger is retracted with the pitted fruit thereon past a guide member which strips the pitted fruit from the plunger while the coring knife is retracted until a free end thereof is positioned between another guide member and a pitting chain which is rotated around the rotatable support. A core cap ejection rod slidably fitted in each coring knife causes the pit to be maintained in the pitting chain while the core cap is held in the coring knife. Each core cap is separated from its associated pit by movement of the pitting chain with the pit therein away from the rotatable support. The coring knife is then further retracted and the core cap ejection rod causes the core cap to be ejected from the coring knife. Finally, ejection rods remove the pits from the pitting chain.

20 Claims, 5 Drawing Figures

FIG.-3 C-D

FRUIT PITTING MACHINE

BACKGROUND

1. Field of the Invention

This invention relates to a fruit pitting machine specifically designed and structured to effect, in addition to the obvious separation of the pit from a drupaceous fruit, such as an olive, the concurrent separation of the pit from its core "cap" or disc-shaped portion of pulp which must be removed from the olive in order to create an orifice for the pit to exit the fruit.

2. Description of the Prior Art

Modern pitting machines, as is well known, are designed to run continuously and to feed olives singly and successively onto a drum where, in a cyclical process, they are held lengthwise while a tubular coring knife, whose diameter determines that of the aforementioned core cap, is applied to one end and a pitting plunger to the other end of the fruit. The pitting plunger pierces the pulp and pushes the pit and its attached core cap through the olive.

Existing pitting machines represent different versions of this basic principle. Some merely eject the pitted olives on one side and the capped pits on the other, whereas others separate the core caps from the pits and replace the caps immediately on the olives, or after they have been stuffed with some suitable material, such as anchovy or pimento paste, etc.

When the olives are not being stuffed, in order to utilize as much of their pulp as possible, the most appropriate and logical solution is to replace the core caps on the olives after the fruits are pitted.

In practice, however, this procedure is often ruled out because replacing the core caps on the olives prevents compliance with certain packing standards requiring that specific containers hold a specific number of olives with a specific net weight. Obviously, replacing the core caps on the olives is not desirable in that case. Thus, there is a substantial loss of material for, although the by-products of the pitting process are recoverable, top quality by-products like olive core caps, when they remain attached to the pits and are processed with them, lose their inherent high quality by virtue of their association with the pits, which results in a by-product of considerably lower quality whose industrial uses are totally different from those of the separated pulp.

SUMMARY OF THE INVENTION

The machine to which this invention refers has been especially designed for use in the specific aforementioned case, that is, when replacement of the core cap is not desired. The objective in this case is to separate the pit from its core cap in an operation concurrent with the pitting process itself. Therefore, in the general context of this machine there are three separate outputs: pitted olives, pits, and core caps. This procedure enables the utilization of the core caps (which are, in fact, olive pulp) as olive chunks, to make olive paste, or for any other similar purpose.

To that end, and more concretely, the fruit pitting machine to which this invention refers consists, as usual, of feeding means, such as a feeder tray from which the fruit such as olives are fed singly onto a fruit conveying means, such as a fruit conveyor chain fitted with conventional prongs that carry the fruit such as olives along a feed path to a pitting drum means, to which the aforementioned chain leads tangentially. The pitting drum means houses a conveyor chain wheel shaft. The fruit conveyor chain rotates about a sprocket mounted on the shaft and is framed by two discs mounted on the shaft, each of which is fitted with an annular row of first and second members, respectively, around the periphery thereof. One end of the fruit, such as an olive, is held by the second members while pitting means, such as pitting plungers, are each guided towards the feed path through a respective opening in the corresponding first member on the other disc, and pierce the opposite end of the fruit. The corresponding first member on the latter disc strips each pitting plunger of any adhering pulp as the plunger retracts away from the feed path and causes the ejection of the fruit such as an olive from the fruit conveyor chain, whereas the second members on the former disc are traversed by core cap and pit receiving means, such as tubular knives, that move toward the feed path and cut out the core caps from the fruit.

One of the special features of this invention is that, in addition to the disc fitted with the first and second members in which the pitting plungers and tubular coring knives operate, there is another disc fitted with a plurality of third members that act as centering guides for the knives. These third members are axially aligned with the aforementioned first and second members; that is, the number and the position of the first and second members correspond to those of the third members. A pitting chain of a pit conveying and separating means, rotates between the discs supporting the second and third members, around a sprocket attached to the aforementioned shaft and, therefore, on a parallel, out-of-phase, plane in respect to that of the fruit conveyor chain.

The pitting or pit conveyor chain runs a full circle under the pitting drum means assisted by its own tension sprocket mounted on an axle parallel to and below the aforementioned shaft. Each link on the pit conveyor chain has an opening aligned with a tubular coring knife and is operationally traversed by it. The diameter of each of these coring knives is large enough to hold the core cap and pit of a fruit such as an olive when they are separated from the fruit or olive during the pitting phase, in which each coring knife moves towards the feed path, traverses its corresponding centering and guiding third member, bit conveyor chain link, and fruit or olive holding second member, then penetrates the fruit or olive, and cores it. At this point the pitting plunger moves toward the feed path and pushes the core cap and pit through the fruit or olive and inserts the core cap and pit into the coring knife.

The coring knife and pitting plunger are then retracted away from the feed path. The core cap and pit are retained inside the knife and the pitted fruit or olive is impaled on the plunger. As the plunger is retracted through the stripping first member, the fruit or olive drops into an ejection chute.

The coring knife is retracted until its mouth clears and is virtually flush with the outer face of a corresponding link on the pit conveyor chain. Concurrently, and just before the knife reaches the end of its retraction cycle, rod means, such as a fixed rod centered inside the knife, pushes the pit and its core cap partially out of the tubular or hollow knife. The pit itself clears the mouth of the knife at this point and becomes lodged in the link of the pitting chain just as the link completes is synchronized rotating movement around the pitting drum means and heads downward in a straight line, causing the pit to be torn away from its core cap. The knife continues its rotating movement along the periphery of the pitting drum means and is further retracted. When the ejection rod is flush with or slightly extended through the mouth of the knife, it pushes the core cap out and into a core cap ejection chute.

Lastly, adjacent the lower end of the pit conveyor chain, where it rotates around its tension sprocket, there is disposed pit ejection means including a rotatable disc mounted on the same axle as the tension sprocket and fitted with a plurality of centering guides and an equal number of pit-ejection rods aligned with the links of the pit conveyor chain when they are passed around the tension sprocket. These rods, the axial movement of which is controlled by a cam means, cause the ejection of the pits into their own ejection chute, separate from the chutes reserved for the fruit or olives and the core caps.

Like the pit-ejection rods, the axial movement of the pitting plungers and tubular coring knives on the upper drum of the machine are also controlled by eccentric fittings, such as cam means.

Thus this machine, in one continuous operation, pits the fruit such as olives and simultaneously separates the fruit, pits, and core caps, enabling the use of the caps as fruit or olive pulp which, in fact, they are.

BRIEF DESCRIPTION OF THE DRAWINGS

The invention will be described with reference to the accompanying drawings, in which.

DETAILED DESCRIPTION OF THE PREFERRED EMBODIMENT

Figure 1:
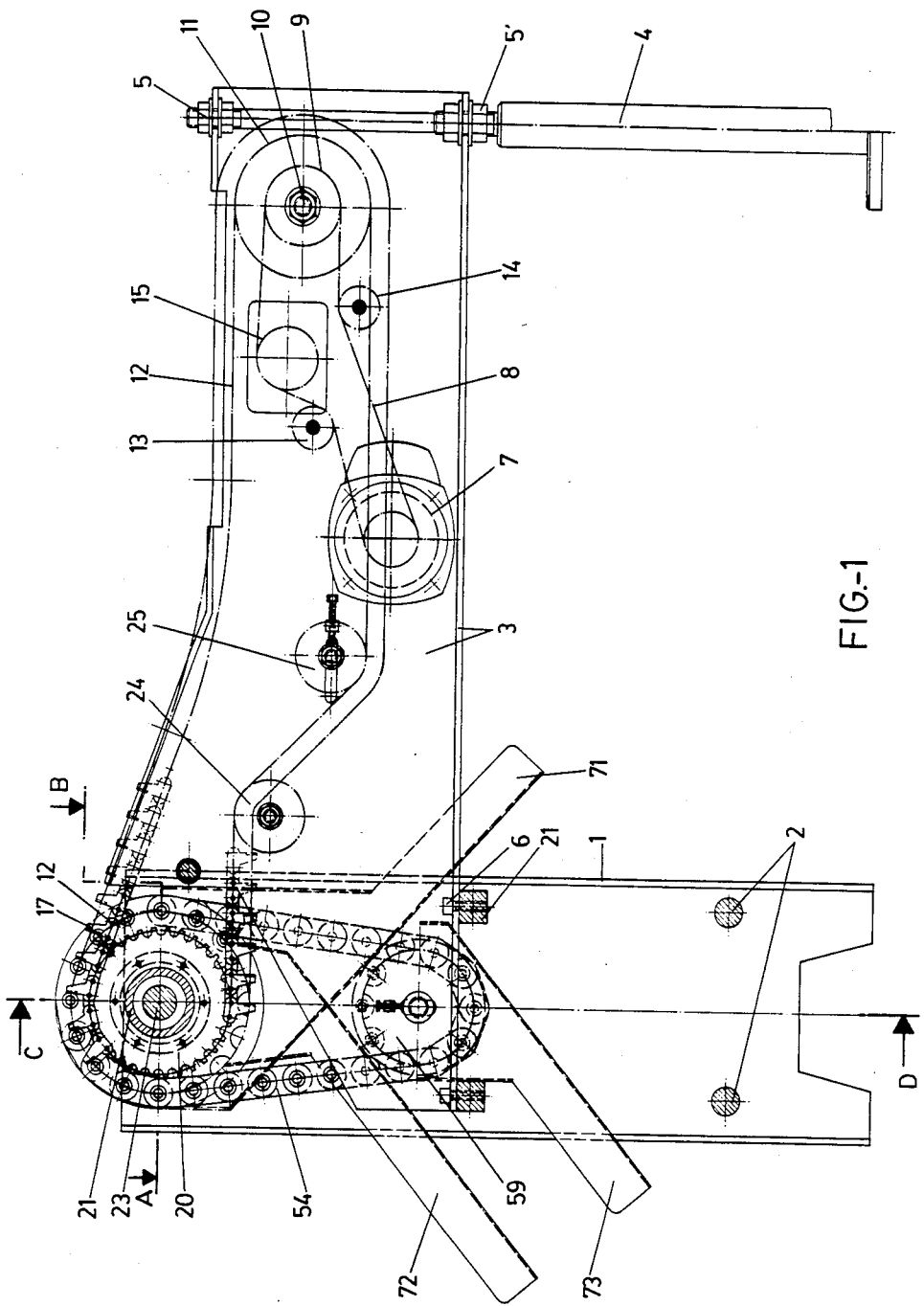
FIG. 1 shows a schematic side view of a partial cross section (through the pitting drum) of a fruit pitting machine, according to the present invention.

The present invention will be explained with reference to the pitting of olives but it will be understood by those skilled in the art that the teachings of the invention are equally applicable to fruit other than olives and as such, it is to be understood that the terms "olive" and "fruit" as used throughout the specification are to interpreted as interchangeable.

The fruit pitting machine of the present invention comprises frame means for supporting the various components of the fruit pitting machine, the frame means including a pair of spaced apart vertical members 1, 1' separated by horizontally extending spacer members, such as a pair of round spacers 2 and a pair of rectangular spacers 2' located above the round spacers 2. A horizontally extending member is supported in a cantilever fashion between the spaced apart vertical members 1, 1'. The other end of the horizontally extending member 3 is supported by suitable means such as a vertically extending member 4. The horizontally extending member 3 can include a central vertical portion, a lower portion which extends perpendicularly from the central portion and an upper portion which extends perpendicularly from the central portion. One end of the lower portion of the horizontally extending member 3 is attached to the rectangular spacers 2' by suitable means, such as bolts 6, while the other end thereof is attached to the vertically extending member 4 by suitable fastening means such as nuts or lock nuts 5'. The vertically extending member 4 includes a portion attached to the upper portion of the horizontally extending member 3 by suitable means, such as a nut or lock nut 5. The frame means provides support for a fruit conveying means for conveying fruit along a feed path to a portion of the feed path at which core caps and pits are removed from the fruit and for conveying pitted fruit to a subsequent point along the feed path at which the pitted fruit is discharged from the fruit conveying means.

The fruit conveying means includes a fruit conveyor chain 12 which is rotated around a sprocket 11 rotatably mounted on a shaft 10 extending from the central portion of the horizontally extending member 3 in a region adjacent the vertically extending member 4. The sprocket 11 is driven for rotation by means of a chain drive 8 which drives a sprocket 9 also mounted on the shaft 10. The chain drive 8 is driven by a motor 7 which is mounted on the central portion of the horizontally extending member 3 towards the middle thereof. A pair of tension sprockets 13, 14 are provided for preventing the chain drive 8 from slipping on the sprocket 9. A fruit feeding means, such as a conventional feeder tray 16 mounted on the horizontally extending member 3, is provided for feeding fruit one at a time to the fruit conveyor chain 12. The fruit feeding means is driven by a sprocket 15 mounted on the horizontally extending member 3 and in engagement with the drive chain 8. The conveyor chain 12 carries the fruit by means of prongs 17 fitted to the conveyor chain 12 which draw or carry the fruit along a guiding track 18 which terminates at a portion of the feed path at which pitting means is provided for removing the core caps and pits from the fruit. The details of the guiding track 18 are omitted since such guide tracks are conventional and are known to those skilled in the art.

Figure 2:
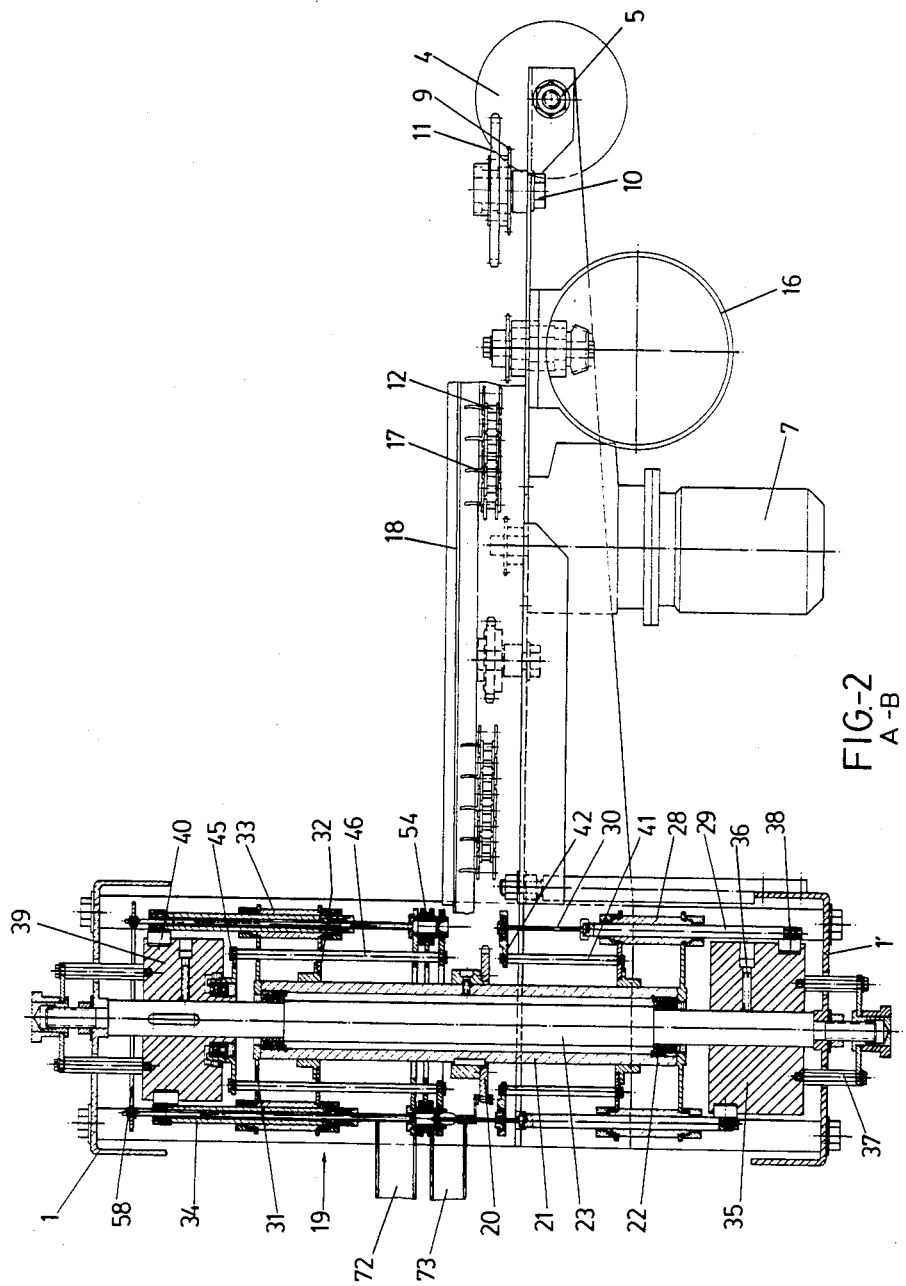
FIG. 2 shows a diametrical cross section of the pitting drum of the machine shown in FIG. 1, along plane A-B.
Figure 3:
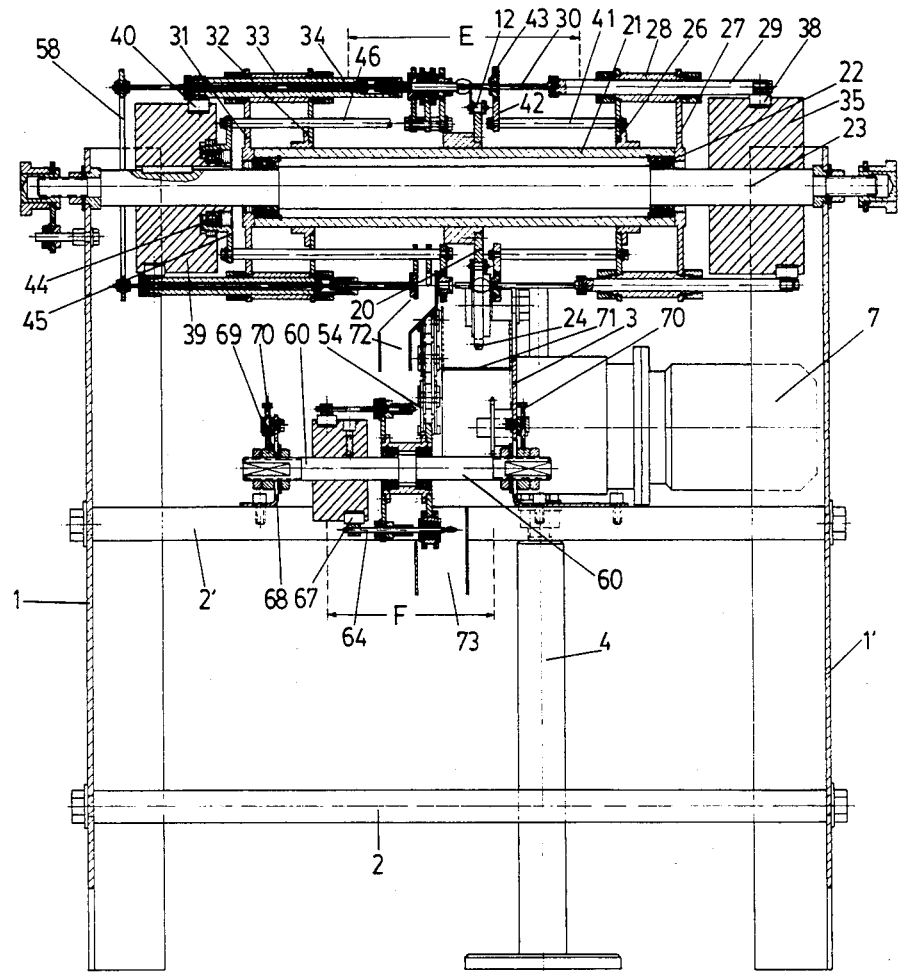
FIG. 3 shows a cross section through the pitting drum of the machine shown in FIG. 1, along plane C-D.

The pitting means is shown generally at 19 in FIG. 2 and includes at least one plunger means for traversing the feed path and removing a core cap and pit from a fruit carried by the conveyor chain 12. The pitting means 19 and the conveyor chain 12 are rotatably supported about the same axis of rotation on a rotatable support means. This axis of rotation of the rotatable support means coincides with the central axis of a fixed horizontally extending shaft 23 which extends between the spaced apart vertical members 1, 1'. A hollow shaft 21 is rotatably supported on the fixed shaft 23 by means of bearings 22 disposed at both ends of the hollow shaft 21. It will be seen from FIGS. 2 and 3 that the hollow shaft 21 is disposed centrally on the fixed shaft 23 and the ends of the hollow shaft 21 are spaced inwardly of the spaced apart vertical members 1, 1'. The conveyor chain 12 is carried by a sprocket 20 fitted to a central portion of the hollow shaft 21 such that movement of the chain 12 due to rotation of the sprocket 11 causes rotation of the hollow shaft 21 fixed to the sprocket 20. A fixed sprocket 24 around which the conveyor chain 12 rotates is mounted on the central portion of the horizontally extending member 3 such that the conveyor chain 12 remains in contact with the sprocket 20 as much as possible to thereby maximize the length of the arc on which there is contact between the sprocket 20 and the conveyor chain 12. In addition, a tension sprocket 25 around which the conveyor chain 12 travels is mounted on the central portion of the horizontally extending member 3 to adjust the tension of the conveyor chain 12.

The pitting means 19 is mounted on the rotatable support means by means, such as discs 26, 27, mounted on the hollow shaft 21. One of the discs 27 is mounted at one end of the hollow shaft 21 while the other disc 26 is mounted inwardly thereof. Since the discs 26, 27 are fixed to the hollow shaft 21, the pitting means rotates in synchronism with movement of the conveyor chain 12. A plurality of guides 28, preferably 16 in number, are supported by the discs and are uniformly distributed on an imaginary cylinder whose axis coincides with the axis of rotation of the hollow shaft 21, which also coincides with the central axis of the fixed shaft 23. A pitting plunger means is supported for axial movement in each of the guides 28. Each pitting plunger means comprises a base 29 and a pitting plunger 30 fitted to an end of the base 29 facing the conveyor chain 12. Each of the pitting plungers 30 are moved towards and away from the feed path by cam means comprising a cam follower 38 attached to a respective pitting plunger base 29, and a stationary cam 35 fixed to the fixed shaft 23 at a position between the disc 27 and one of the spaced apart vertical members 1, 1' by suitable means, such as bolts 36, 37. The cam follower attached to each pitting plunger base 29 is fitted in a cam groove extending around the outer periphery of the cam 35 to cause each respective pitting plunger 30 to move toward and away from the feed path once during each revolution thereof around the fixed cam 35. The movement of the pitting plungers 30 towards the feed path results in each pitting plunger piercing a respective fruit so that the core and pit from the fruit can be received in core cap and pit receiving means disposed on the opposite side of the feed path.

The core cap and pit receiving means includes at least one coring knife means for cutting a core cap and for receiving the core cap and pit removed from a fruit by one of the pitting plunger means, which is axially aligned with the coring knife means. The coring knife means is supported on the rotatable support means, which further includes two spaced apart discs 31, 32, mounted on the hollow shaft 21. One of the discs 31 is fitted to an end of the hollow shaft 21 while the other disc 32 is spaced inwardly therefrom. A plurality of guides 33, preferably the same in number as the number of guides 28, are fitted on the discs 31, 32 and uniformly distributed on an imaginary cylinder whose axis coincides with the axis of rotation of the hollow shaft 21. A plurality of coring knife means are supported for axial movement towards and away from the feed path with one of the coring knife means received in each of the guides 33. Each coring knife means comprises a tubular base 34, a tubular knife 52 slidably mounted in the tubular base 34 and a spring 56 fitted between the base 34 and the tubular knife 52 to bias the tubular knife 52 in a direction towards the feed path. Each coring knife means is guided towards and away from the feed path by cam means, such as a cam follower 40 fitted to the base 34 of each coring knife means, and a cam 39 having a cam groove extending around the periphery thereof with the cam follower 40 fitted in the cam groove. The cam 39 is fitted to the fixed shaft 23 at a position between the disc 31 and the other of the spaced apart vertical members 1, 1'. Each cam follower 40 travels around the cam groove in the cam 39 such that a respective coring knife means moves towards and away from the feed path once for each revolution thereof around the cam 39. Since the coring knife means, the pitting means and the sprocket 20 are all fitted to the hollow shaft 21 they are rotated in synchronism with each other. The cams 35 and 39, which are fixed to the fixed shaft 23 by suitable means, such as radially extending screws 36 and axially extending screws 37, cause the respective axially aligned pitting plungers 30 and coring knifes 52 to approach each other along a portion of the feed path such that the coring knife 52 cuts a core cap in one end of a fruit carried by the conveyor chain and the pitting plunger 30 pierces the opposite end of the fruit and pushes the pit and core cap of the fruit into the coring knife 52 after which the knife 52 is retracted away from the feed path with the core cap and pit therein and the pitted fruit remains impaled on the pitting plunger 30 until the pitting plunger 30 is retracted and the pitted fruit falls freely therefrom.

The pitting machine includes means on either side of the feed path for guiding the pitting plungers 30 and the coring knifes 52 as they move towards and away from the feed path. The pitting plungers 30 are guided by means of a disc 42, which is disposed on the same side of the feed path as the pitting means and adjacent to the conveyor chain 12, a plurality of axially extending rods 41, preferably six in number, extending between the disc 42 and the disc 26 and a plurality of plunger guide members 43, each of which is mounted on the disc 42 and axially aligned with a corresponding one of the pitting plungers 30. The plunger guide members 43 each have a hole therein for passage of a corresponding one of the pitting plungers 30 therethrough when the pitting plunger is moved towards the feed path and for stripping the pitting plunger 30 of any adhering! pulp when the pitting plunger is moved away from the feed path and the plunger guide members 43 also serve as an opposing surface to cause ejection of the fruit from the pitting plungers 30, when the pitting plungers are retracted away from the feed path such that the ends thereof are moved further from the feed path than the opposing surfaces of the plunger guide members.

Figure 4:
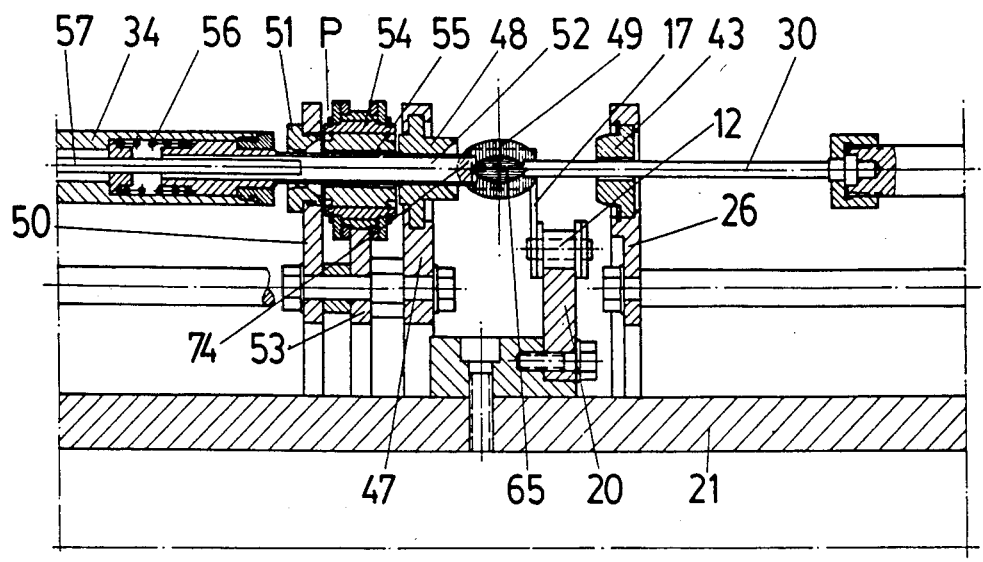
FIG. 4 is an enlarged view of detail E, shown in FIG. 3.
Figure 5:
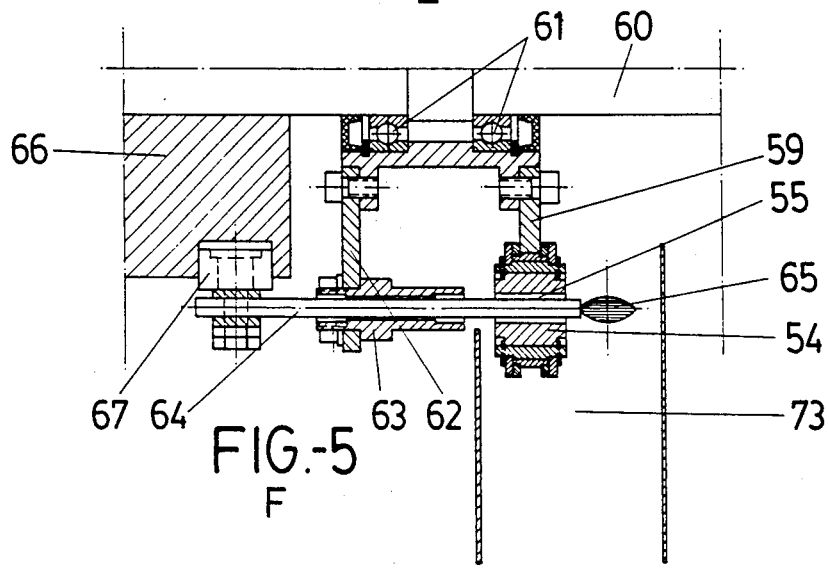
FIG. 5 is an enlarged view of detail F, shown in FIG. 3.

The coring knives 52 are guided by means of a disc 47, which is disposed on the same side of the feed path as the coring knife means and adjacent to the conveyor chain 12, and a plurality of knife guiding members 48 fitted to the disc 47, each of which is axially aligned with a corresponding one of the coring knives 52 and has an opening therethrough for passage of a corresponding one of the coring knives 52 when the corresponding coring knife is moved towards the feed path to cut a core cap in a fruit and receive the core cap and pit removed from a fruit by a corresponding one of the pitting plungers 30. A disc 45 is positioned between the disc 31 and the cam 39 and bearings 44 are fitted between the disc 45 and the cam 39 such that the disc 45 can rotate freely around an axis of rotation which coincides with the central axis of the fixed shaft 23. A plurality of rods 46, preferably 6 in number, extend through openings in discs 31, 32 and are fitted at one end thereof to the disc 45 and at the other end thereof to the disc 47. Since the rods 46 extend through openings in discs 31, 32, rotation of the discs 31, 32 will cause synchronized rotation of the knife guiding members 48 with the coring knives 52, even when the coring knives 52 are moved away from the feed path and out of engagement with the holes in the knife guiding members 48. The knife guiding men1bers 48 each have a cup-shaped recess facing the feed path, as shown in FIG. 4. These cup-shaped recesses receive the fruit 49 when the pitting plungers 30 are moved towards the feed path to push the pits 65 and core caps 74 (which have been cut by the coring knives 52) into the coring knives 52, as shown in FIG. 2.

Once the core caps 74 and pits 65 are removed from the fruit 49 it is necessary to separate the core caps 74 from the pits 65. Thus, the present invention provides pit conveying and separating means disposed along the portion of the feed path at which the core caps and pits are removed from the fruit for separating pits from the core caps and conveying the pits away from the feed path. The pit conveying and separating means includes a pitting chain 54 which is rotatably supported on the rotatable support means for synchronism movement along with the conveyor chain 12 along only the portion of the feed path at which the core caps and pits are removed from the fruit. A sprocket 53 is mounted on the rods 46 adjacent the disc 47 to provide movement of the pitting chain 54 in synchronism with movement of the conveyor chain 12. The pitting chain 54 is comprised of a plurality of links, each of which has a hole therein which is in axial alignment with and sized to allow passage of a respective coring knife 52 therethrough when the links are carried by the sprocket 53. The pitting chain 54 also rotates around a tension sprocket 59 positioned below the sprocket 53, as shown in FIG. 1. The lower tension sprocket 59 is mounted on a fixed, non-rotatable shaft 60 which has an axis which is parallel to and below the fixed shaft 23. Bearings 61 are provided between the axis of the fixed shaft 60 and the tension sprocket 59 whereby the tension sprocket 59 is rotated freely around the shaft 60 due to rotation of the pitting chain 54. The fixed shaft 60 is mounted on the rectangular spacers 2' by means of angle brackets 68 having holes 69 therein through which the fixed shaft 60 extends. The tension of the pitting chain 54 is adjusted by means of hold down screws 70 which adjust the position of the fixed shaft 60 and thus the position of the tension sprocket 59 with respect to the other sprocket 53 supporting the pitting chain 54. The pitting chain 54 is effective in separating the pits 65 from the core caps 74 and for conveying the separated pits 65 away from the feed path, as will become apparent from the following description.

The pitting chain 54 is arranged to depart from its synchronized movement with the conveyor chain 12 at a point where the core caps 74 remain in the coring knives 52 and are torn from the pits 65 which remain in the holes 55 in the pitting chain 54. To accomplish this result a disc 50 is fitted on the rods 46 at a position adjacent the sprocket 53 such that the sprocket 53 is positioned between the disc 50 and the disc 47. A plurality of knife guiding and core cap receiving members 51 are provided on the disc 50 with each of the knife guiding and core cap receiving members 51 having an opening therein axially aligned with and sized for passage of a respective coring knife 52 therethrough. Each of the knife guiding and core cap receiving members 51 have a cup-shaped recess facing the pitting chain 54. The cam followers 40 following the cam groove on the cam 39 cause each of the coring knives 52 to be moved away from the feed path until the end thereof is flush with a vertical plane P (FIG. 4) extending between the knife guiding and core cap receiving members 51 and the pitting chain 54 at a point along the feed path prior to or where the pitting chain 54 departs from its synchronized rotation with the conveyor chain 12. As such, the core cap 74 remains lodged in the coring knife 52 and the pit 65 (which is held in a hole 55 in a link of the pitting chain 54) is torn from the core cap 74 and is conveyed away from the feed path by the pitting chain 54. After the core cap 74 is separated from the pit 65, the coring knife 52 is further retracted away from the feed path such that the core cap 74 is received in the cup-shaped recess in the knife guiding and core cap receiving member 51 and thereafter falls freely therefrom. Core cap ejection means is provided to eject the core caps 74 from the coring knives 52 as the coring knives are retracted away from the feed path beyond the cup-shaped recess in the knife guiding and core cap receiving members 51. The core cap ejection means can comprise rods 57 each of which extends through a hollow base 34 and hollow knife 52. The rods 57 are mounted on a base 58 positioned along the fixed shaft 23 such that the ends of the rods 57 prevent the core cap 74 from being moved away from the feed path beyond the cup-shaped recess in the knife guiding and core cap receiving members 51. The base 58 should be rotatable around the fixed shaft 23 but prevented from axial movement along the fixed shaft 23 by any suitable means.

The fruit pitting machine of the present invention includes pit ejection means for removing pits from the openings 55 in the pitting chain 54. The pit ejection means is disposed adjacent the tension sprocket 59 and can comprise pit ejection rod means and means for moving the pit ejection rod means into and out of the openings in the pitting chain to eject pits therefrom. The pit ejection rod means are slidably received in guides 63 mounted on a disc 62 rotatably supported on the fixed shaft 60. The guides 63, preferably 10 in number, are distributed on an imaginary cylinder around the disc 62 such that each of the guides 63 are in axial alignment with a respective opening 55 in the pitting chain 54 when the pitting chain 54 is rotated around the tension sprocket 59. The pit ejection rod means includes a plurality of rods 64, each of which is slidably received in a respective guide 63. The means for moving the pit ejection rod means includes a cam 66 which is fixed to the fixed shaft 60, the cam 66 having a cam groove extending around the outer periphery thereof and cam followers 67 are attached to each of the rods 64 and fitted in the cam groove such that the rods 64 are caused to move into and out of a corresponding one of the openings in the pitting chain to thereby eject pits from the pitting chain for every revolution thereof around the cam 66. Thus, the disc 62 comprises a rotatable ejection rod support means for supporting the plurality of rods 64 and rotating the rods in synchronism with movement of the pitting chain 54 when it is carried on the tension sprocket 59.

The pitting machine of the present invention is effective in removing core caps and pits from fruit and then separating the core caps from the pits as well as discharging the pitted fruit, the core caps and the pits at different points along the feed path. Thus, chutes are provided to collect the pitted fruit, the core caps and the pits. As shown in FIG. 1, a chute 71 is positioned between the discs 42 and 47 to collect the pitted fruit when each pitting plunger 30 is retracted beyond the respective pitting plunger guide member 43. Another chute 72 is positioned between the disc 50 and the pitting chain sprocket 53 to collect core caps 74 when a respective knife 52 is retracted beyond the cup-shaped recess in the corresponding knife guiding and core cap receiving member 51. A third chute 73 is positioned below the tension sprocket 59 for collecting pits ejected from the pitting chain 54 when a respective rod 64 is extended through the corresponding opening 55 in the pitting chain to thereby eject a pit therein from the pitting chain 54.

The operation of the pitting machine will now be described based on the foregoing structure:

The fruit, such as olives, are fed one at a time to the fruit conveyor chain 12 by the feeder tray 16 in a conventional manner and the fruit travel, singly, toward the pitting means 19, drawn by the prongs 17 along the guiding track 18. When the fruit reach the pitting means 19, the cams 35, 39 cause the pitting plungers 30 and coring knives 52 to move toward each other, as shown in FIG. 4. The plunger 30 pierces one end of the fruit 49 and the coring knife 52 cuts out the core cap in the other end of the fruit. The plunger 30 then forces the pit 65 and core cap 74 into the hollow knife 52 and the pitted fruit 49 remains impaled on the pitting plunger 30. In the unlikely event that the pit will not enter the hollow knife because the fruit is improperly positioned, the coring knife 52 is retracted against the spring 56 without being damaged by the pit 65.

As the pitting plunger 30 and the coring knife 52 are rotated in synchronism with rotation of the conveyor chain 12 around the sprocket 20, the cams 35, 39 cause the pitting plunger 30 and coring knife 52 to be retracted away from the feed path. The fruit 49 remains impaled on the plunger 30 until the fruit engages a respective pitting plunger guide member 43 after which the pitting plunger 30 is further withdrawn until the end thereof is retracted beyond the surface of the pitting plunger guide member 43 facing the pitted fruit 49 and the pitted fruit 49 falls freely, into the chute 71. Simultaneously, as the pitting plunger 30 is retracted through the hole in the pitting plunger guide member 43, it is stripped of any adhering pulp by the pitting plunger guide member 43. The coring knife 52 is also retracted away from the feed path by its cam 39 until the end of the coring knife 52 is flush with a vertical plane P passing between the knife guiding and core cap receiving member 51 and the pitting chain 54, as shown in FIG. 4. Since the pitting chain travels towards the tension sprocket 59 and thus moves out of the feed path, the pit 65 received in an opening 55 of the pitting chain 54 is torn from the core cap 74 which remains in the coring knife 52 while the pit 65 travels away from the feed path in the pitting chain 54. Then, the coring knife 52 is further retracted until the end of the core cap ejection rod 57 extends through the end of the coring knife 52 and pushes the core cap 74 out of the coring knife 52 so that it drops into the chute 72.

Finally, the pitting chain 54 with the pits 65 therein travels around the lower tension sprocket 59 and the pits are ejected from the pitting chain 54 by the pit ejection rods 64. The pit ejection rods 64 are caused to move into the respective openings 55 in the pitting chain 54 by the cam 66 which results in ejection of the pits 65 from the pitting chain 54 and the pits 65 fall into the chute 73. The cam 66 causes the pit ejection rods 64 to be retracted out of the holes 55 in the pitting chain 54 before the respective links of the pitting chain 54 move away from the tension sprocket 59 and back towards the sprocket 53.

Suitable containers can be placed under the chutes 71, 72, 73 to collect the separated pitted fruit 49, pits 65 and core caps 74.

The preceding specific embodiment is illustrative of the practice of the invention. It is to be understood, however, that other expedients known to those skilled in the art or disclosed herein, may be employed without departing from the spirit of the invention or the scope of the appended claims.

What is claimed is:

1. A fruit pitting machine, comprising:
fruit conveying means for conveying fruit along a feed path to a portion of said feed path at which core caps and pits are removed from the fruit and for conveying pitted fruit to a subsequent point along said feed path at which the pitted fruit is discharged from said fruit conveying means;
feeding means disposed along said feed path for feeding fruit one at a time to said fruit conveying means;
pitting means disposed along said portion of said feed path from removing core caps and pits from the fruit;
core cap and pit receiving means disposed along said portion of said feed path for cutting core caps in the fruit and for receiving core caps and pits removed from the fruit by said pitting means; and
pit conveying and separating means disposed along said portion of said feed path for separating pits from core caps by receiving pits with their associated core caps attached thereto from said core cap pit receiving means and conveying the pits away from said feed path to strip the pits from their associated core caps.

2. A fruit pitting machine, comprising:
fruit conveying means for conveying fruit along a feed path to a portion of said feed path at which core caps and pits are removed from the fruit and for conveying pitted fruit to a subsequent point along said feed path at which the pitted fruit is discharged from said fruit conveying means, said friut conveying means including a fruit conveyor chain and at least two sprockets supporting said fruit conveyor chain;
feeding means disposed along said feed path for feeding fruit one at a time to said fruit conveying means;
pitting means disposed along said portion of said feed path from removing core caps and pits from the fruit;
core cap and pit receiving means disposed along said portion of said feed path for cutting core caps in the fruit and for receiving core caps and pits removed from the fruit by said pitting means; and
pit conveying and separating means disposed along said portion of said feed path for separating pits from core caps by receiving pits with their associated core caps attached thereto from said core cap and pit receiving means and conveying the pits away from said feed path to strip the pits from their associated core caps, said pit conveying and separating means including a pitting chain and at least two sprockets supporting said pitting chain, one of said sprockets supporting said fruit conveyor chain and one of said sprockets supporting said pitting chain being rotatable coaxially about a first axis of rotation, the other one of said sprockets supporting said fruit conveyor chain, and the other of said sprockets supporting said pitting chain being rotatable about different axes of rotation which are parallel to said first axis of rotation.

3. The fruit pitting machine of claim 1, further comprising a first chute for collecting pitted fruit, a second chute for collecting core caps and a third chute for collecting pits.

4. The fruit pitting machine of claim 1, wherein said pitting means comprises at least one plunger means for traversing said feed path and removing a core cap and pit from a fruit and said core cap and pit receiving means comprises at least one coring knife means axially aligned with said at least one plunger means for cutting a core cap and for receiving the core cap and pit removed from a fruit by said plunger means, said coring knife means including a tubular base, a tubular knife received in said base and a spring fitted between said tubular base and said tubular knife to prevent damage to said knife when a pit removed by said pitting means will not fit into said tubular knife.

5. The fruit pitting machine of claim 4, further comprising core cap ejection means disposed within said coring knife means for pushing the pit and its associated core cap sequentially out of said coring knife means when said coring knife means is moved away from said feed path, and said pit conveying and separating means includes a pit conveyor means for receiving the pit pushed out of said coring knife means by said core cap ejection means and for conveying the pit away from said feed path to separate the pit from the core cap.

6. The fruit pitting machine of claim 1, further comprising rotatable support means for rotatably supporting said fruit conveying means over said portion of said feed path, said pitting means and said core cap and pit receiving means, said pitting means including a plurality of plunger means movable towards and away from said feed path for removing core caps and pits from the fruit conveyed by said fruit conveying means, said core cap and pit receiving means including a plurality of coring knife means movable towards and away from said feed path for cutting the core caps and for receiving the core caps and pits removed from a fruit by said plunger means, each of said plunger means being axially aligned with a corresponding one of said coring knife means, and said fruit conveying means, said plurality of plunger means and said plurality of coring knife means being rotatable in synchronism with each other around said rotatable support means to thereby sequentially remove the core cap and pit from each fruit conveyed by said fruit conveying means.

7. A fruit pitting machine, comprising:
fruit conveying means for conveying fruit along a feed path to a portion of said feed path at which core caps and pits are removed from the fruit and for conveying pitted fruit to a subsequent point along said feed path at which the pitted fruit is discharged from said fruit conveying means;
feeding means disposed along said feed path for feeding fruit one at a time to said fruit conveying means;
pitting means disposed along said portion of said feed path for removing core caps and pits from the fruit;
core cap and pit receiving means disposed along said portion of said feed path for cutting core caps in the fruit and for receiving core caps and pits removed from the fruit by said pitting means;
pit conveying and separating means disposed along said portion of said feed path for separating pits from core caps by receiving pits with their associated core caps attached thereto from said core cap pit receiving means and conveying the pits away from said feed path to strip the pits from their associated core caps; and
rotatable support means for rotatably supporting said fruit conveying means over said portion of said feed path, said pitting means and said core cap and pit receiving means, said pitting means including a plurality of plunger means movable towards and away from said feed path for removing core caps and pits from the fruit conveyed by said fruit conveying means, said core cap and pit receiving means including a plurality of coring knife means movable towards and away from said feed path for cutting the core caps and for receiving the core caps and pits removed from a fruit by said plunger means, each of said plunger means being axially aligned with a corresponding one of said coring knife means, and said fruit conveying means, said plurality of plunger means and said plurality of coring knife means being rotatable in synchronism with each other around said rotatable support means to thereby sequentially remove the core cap and pit from each fruit conveyed by said fruit conveying means, said rotatable support means supporting at least part of said pit conveying and separating means, said pit conveying and separating means including a pitting chain for separating pits from their associated core caps and for conveying the pits away from said feed path, said pitting chain rotatably supported by said rotatable support means at a position adjacent said fruit conveying means for synchronized movement therewith along said portion of said feed path.

8. The fruit pitting machine of claim 7, wherein said rotatable support means includes cam means disposed on each side of said feed path for guiding each of said plunger means and said coring knife means towards and away from said feed path to effect cutting of the core cap and removal of the core cap and pit from each fruit as each plunger means and coring knife means is guided towards said feed path, and wherein each of said coring knife means includes a tubular base, a tubular knife received in said base and a spring fitted between said tubular base and said tubular knife to prevent damage to said knife when a pit removed from a fruit by a corresponding plunger means will not fit into said tubular knife.

9. The fruit pitting machine of claim 7, wherein said rotatable support means includes a first cam means disposed on one side of said feed path for guiding each of said plunger means towards and away from said feed path to effect removal of the core cap and pit from each fruit as each plunger means is guided towards said feed path, and said rotatable support means further includes a second cam means disposed on the other side of said feed path for guiding each of said coring knife means towards and away from said feed path to effect cutting of a core cap and receipt of the core cap and pit removed from each fruit by a corresponding one of said plunger means.

10. The fruit pitting machine of claim 6, wherein said rotatable support means includes a plurality of pitting plunger guide members disposed on one side of said feed path, each of said members being axially aligned with a corresponding one of said plurality of plunger means and having an opening therein for passage of said corresponding one of said plunger means therethrough when said plunger means is moved towards said feed path and for stripping said plunger means of any adhering pulp when said plunger means is moved away from said feed path.

11. The fruit pitting machine of claim 10, wherein said rotatable support means includes a plurality of knife guiding members disposed on the other side of said feed path, each of said knife guiding members being axially aligned with a corresponding one of said plurality of coring knife means and having an opening therein for passage of said corresponding one of said coring knife means therethrough at least when said coring knife means is moved towards said feed path to cut a core cap and receive the core cap and pit removed from a fruit by a corresponding one of said plunger means.

12. The fruit pitting machine of claim 11, wherein said fruit conveying means includes a fruit conveyor chain and at least two sprockets supporting said fruit conveyor chain, one of said sprockets being rotatably supported by said rotatable support means and positioned between said plurality of pitting plunger guide members and said knife guiding members, said plurality of pitting plunger guide members and said knife guiding members being rotatably supported by said rotatable support means for movement in synchronism with movement of said fruit conveyor chain.

13. The fruit pitting machine of claim 12, wherein said rotatable support means supports at least part of said pit conveying and separating means, said pit conveying and separating means including a pitting chain and at least two sprockets supporting said pitting chain, one of said sprockets supporting said pitting chain being rotatably supported by said rotatable support means and positioned adjacent said plurality of knife guiding members, said pitting chain being movable in synchronism with said fruit conveyor chain along said portion of said feed path and said pitting chain having openings therein, each of said openings receiving the pit removed from a fruit when a respective coring knife means is retracted away from said feed path beyond said pitting chain with the core cap of the fruit still within said coring knife means.

14. The fruit pitting machine of claim 13, further comprising a plurality of rod means each of which is disposed in one of said plurality of coring knife means for pushing the pit and its associated core cap sequentially out of said coring knife means when said coring knife means is moved away from said feed path after receiving the pit and core cap removed from a fruit by a corresponding one of said plunger means.

15. The fruit pitting machine of claim 14, further comprising a plurality of knife guiding and core cap receiving members disposed on said rotatable support means, each of said knife guiding and core cap receiving members being axially aligned with a respective coring knife means and positioned adjacent said pitting chain with said pitting chain positioned between said knife guiding and core cap receiving members and said coring knife guiding members, each of said knife guiding and core cap receiving third members having an opening therethrough for guiding a respective coring knife means at least when said respective coring knife means is moved towards and away from said feed path, each of said knife guiding and core cap receiving members having a recess facing said pitting chain for allowing the core caps to fall freely from said knife guiding and core cap receiving members as said coring knife means are retracted away from said feed path beyond each said recess.

16. The fruit pitting machine of claim 15, wherein said rotatable support means includes a first cam means disposed on one side of said feed path for guiding each of said plunger means towards and away from said feed path to at least effect removal of the core cap and pit from each fruit as each plunger means is guided towards said feed path, and a second cam means disposed on the other side of said feed path for guiding each of said coring knife means towards and away from said feed path to at least effect receipt of the core cap and pit from each fruit removed by a corresponding one of said plunger means.

17. The fruit pitting machine of claim 13, further comprising pit ejection means disposed adjacent the other of said sprockets supporting said pitting chain, said pit ejection means including pit ejection rod means and means for moving said pit ejection rod means into and out of said openings in said pitting chain to eject pits therefrom.

18. The fruit pitting machine of claim 17, wherein said pit ejection rod means comprises a plurality of rods and said means for moving said pit ejection rod means includes a rotatable support means for supporting said plurality of rods and rotating said rods in synchronism with movement of said pitting chain, a fixed cam having a cam groove on an outer periphery thereof and a cam follower on each of said rods fitted in said cam groove for following said cam groove and moving each of said rods into and out of a corresponding one of said openings in said pitting chain to thereby eject pits from said pitting chain.

19. The fruit pitting machine of claim 16, wherein said first cam means includes a fixed cam having a cam groove on an outer periphery thereof and cam followers on each of said plunger means for following said cam groove and moving each of said plunger means towards and away from said feed path during rotation of said rotatable support means.

20. The fruit pitting machine of claim 16, wherein said second cam means includes a fixed cam having a cam groove on an outer periphery thereof and cam followers on each of said coring knife means for following said cam groove and moving each of said coring knife means towards and away from said feed path during rotation of said rotatable support means.

* * * * *